United States Patent [19]

Goral et al.

[11] Patent Number: 4,889,037
[45] Date of Patent: Dec. 26, 1989

[54] CHAMBER EQUIPPED WITH A BREATHER OPENING TO THE ATMOSPHERE

[75] Inventors: Erhard Goral, Peine; Walter Mensing, Pattensen, both of Fed. Rep. of Germany

[73] Assignee: Wabco Westinghouse Fahrzeugbremsen GmbH, Hanover, Fed. Rep. of Germany

[21] Appl. No.: 280,100

[22] Filed: Dec. 5, 1988

[30] Foreign Application Priority Data

Dec. 14, 1987 [DE] Fed. Rep. of Germany ....... 3742343

[51] Int. Cl.[4] ............................................. F15B 21/04
[52] U.S. Cl. .......................................... 92/78; 55/310; 92/130 A
[58] Field of Search ................. 35/310; 220/DIG. 27; 137/554, 546, 587; 92/78, 130 A

[56] References Cited

U.S. PATENT DOCUMENTS

| | | |
|---|---|---|
| 1,801,953 | 4/1931 | Caminez ................................. 92/78 |
| 2,109,718 | 3/1938 | Bayers ................................. 92/78 X |
| 2,542,198 | 2/1951 | Horton ................................. 92/78 X |
| 2,985,358 | 5/1961 | Lee ................................. 92/78 X |
| 3,692,051 | 9/1972 | Eyb ................................. 137/587 X |
| 3,943,831 | 3/1976 | Coupland ..................... 92/130 A X |
| 4,041,569 | 8/1977 | Peterson ........................... 55/310 X |
| 4,433,984 | 2/1984 | Gartside et al. .................. 55/310 X |
| 4,478,319 | 10/1984 | Casalone et al. . |

FOREIGN PATENT DOCUMENTS

| | | | |
|---|---|---|---|
| 2744292 | 5/1979 | Fed. Rep. of Germany ... | 92/130 A |
| 235728 | 6/1925 | United Kingdom .................... | 92/78 |
| 1460280 | 12/1976 | United Kingdom . | |

Primary Examiner—Stephen M. Hepperle
Attorney, Agent, or Firm—J. O. Ray, Jr.

[57] ABSTRACT

The invention provides an open breather chamber in front of the breather chamber proper with the cross-sectional and length ratios lying within certain configurations so that solids, fluid and steam particles will enter the breather chamber and not cause problems within a chamber containing working components.

4 Claims, 2 Drawing Sheets

CHAMBER EQUIPPED WITH A BREATHER OPENING TO THE ATMOSPHERE

FIELD OF THE INVENTION

The present invention relates, in general, to chambers that are connected for fluid communication with the atmosphere during their use and, more particularly, this invention relates to a chamber that is equipped with a specially designed breather opening to such atmosphere, which, during such use, will substantially minimize any undesirable contaminants that may be entrained in such atmosphere from entering into the interior of such chamber.

BACKGROUND OF THE INVENTION

Prior to the present invention, a chamber of this general type has been disclosed in the prior art. See, for example, the WABCO publication "Membrane Cylinders 423000, Part 2" that was issued in January, 1979. This publication generally discloses a chamber for a membrane cylinder that is connected for fluid communication with the atmosphere. As can be seen therein, this membrane cylinder chamber is connected for fluid communication with the environment, i.e., atmosphere, by a breather opening. This breather opening, located through a wall of the chamber, is identified in this publication by the letter "C". Through the use of the breather opening, the ambient pressure within the chamber will be substantially maintained at atmospheric pressure, even when a temperature change occurs within such membrane cylinder chamber. In addition, such ambient and atmospheric pressure will be maintained when the volumetric size of such chamber changes, as a consequence of the membrane cylinder changing its relative position within the chamber upon activation. In other words, this chamber is permitted to breath through the breather opening provided through the wall of such chamber.

Because of this chamber breathing action, the breather opening enables fluid communication of an ambient media, such as, air, into the interior portion of such chamber. However, this media may often contain a variety of undesirable contaminants entrained therein. Such contaminants may be in the form of solids, liquids, steam particles, and/or a combination of these and other contaminants. These contaminants, in turn, can cause other source operating problems within the chamber and especially with the movable components contained therein. Such problems include, but are not limited to, wear caused by the solid contaminants and rust caused by the liquid and/or steam particles. Obviously, such wear and/or rust shortens the useful life of the equipment.

SUMMARY OF THE INVENTION

A breather opening that is connected for fluid communication with the atmosphere is provided in a chamber. According to the present invention, this breather opening is preceded by an open breather chamber connected to such chamber adjacent the breather opening. The entry section of the breather chamber is generally between about 4.0 to about 25.0 times the size of the cross-sectional area of the breather opening section. The length of the breather chamber in relation to the diameter (D) of the entry section or a representative circular area of such entry section is in a ratio of at least about 0.6.

OBJECTS OF THE INVENTION

It is, therefore, one of the primary objects of the present invention to provide a relatively simple means that will protect a chamber against the undesirable intrusion of detrimental solid, liquid, steam, and/or a combination of these and other particles into such chamber.

Another object of the present invention is to provide a breather chamber for a chamber which can be made from a variety of materials such as metallic, rubber, and plastic.

Still another object of the present invention is to provide a breather chamber for a chamber which can be implemented in a cost-effective manner.

Yet another object of the present invention is to provide a breather chamber in which the breather opening provided through a wall of the chamber leads directly to such breather chamber.

An additional object of the present invention is to provide a breather chamber which can be connected to the main chamber by way of a nipple so that the opening or inside diameter of such nipple forms the breather opening.

The above objects and advantages of the present invention, as well as various additional objects and advantages, will become more readily apparent to persons skilled in the art from the following more detailed description of the invention, when such description is taken in conjunction with the attached drawings and with the appended claims.

BRIEF DESCRIPTION OF THE INVENTION

Figure 1:
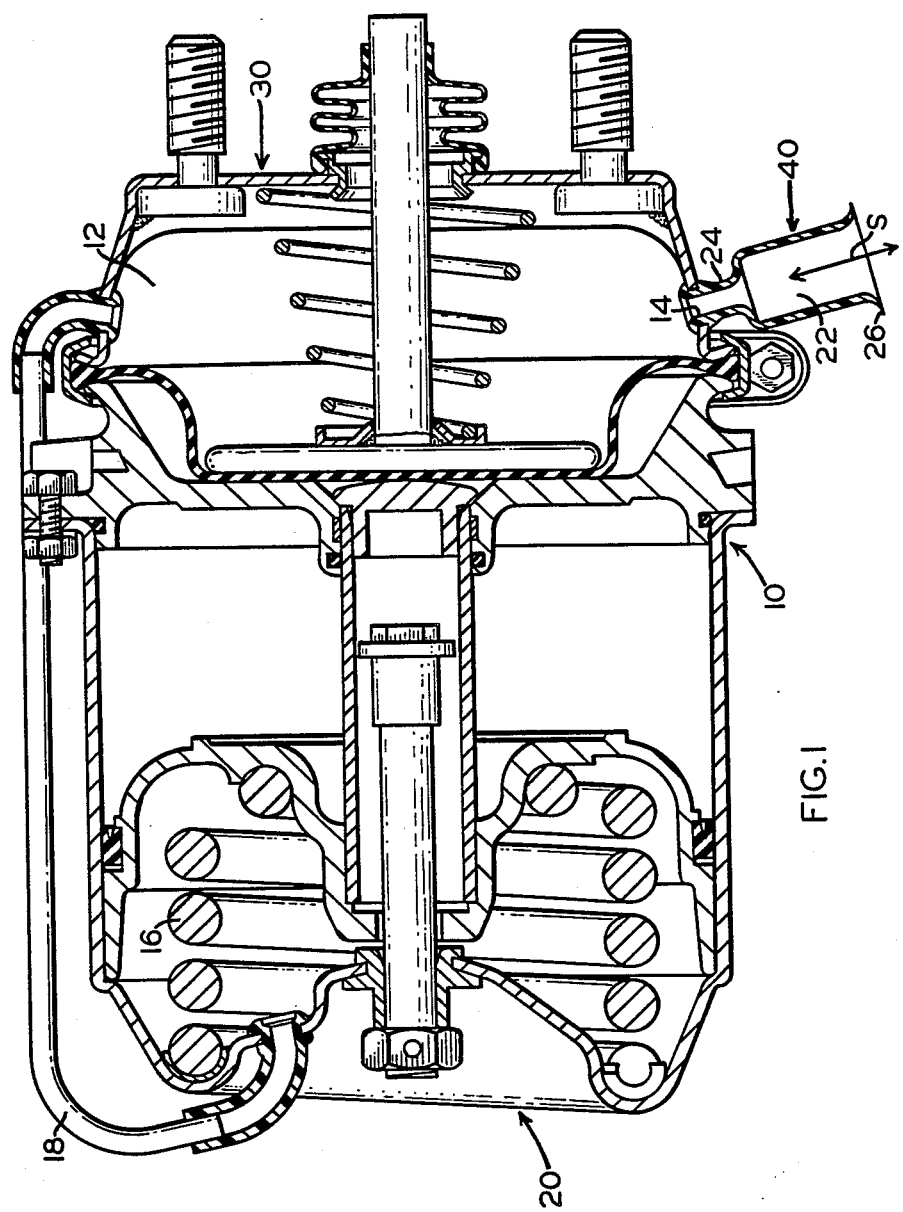
FIG. 1 is a cross-sectional view which illustrates a breather opening in a chamber equipped with a breather chamber, constructed according to one presently preferred embodiment of the invention, in combination with a spring-loaded brake cylinder.

Prior to proceeding to the detailed description of the invention, it should be noted that throughout the several views of the drawings identical components have been identified with identical reference numerals for the sake of clarity.

Now refer more particularly to FIG. 1. Illustrated therein is a combination spring-loaded brake cylinder, generally designated 1. Such combination spring-loaded brake cylinder 10 consists of a spring retainer portion, generally designated 20, and a brake component, generally designated 30. The brake component 30 acts as a membrane cylinder. The combination spring-loaded brake cylinder 10 as well as its various components are customary in design and, consequently, are not explained in any significant detail here. Further, an explanation of the combination spring-loaded brake cylinder 10 is not necessary for an understanding of the present invention.

The brake component 30 of the combination spring-loaded brake cylinder 10 consists of an air chamber 12, which is connected for fluid communication with the environment by way of a breather opening 14. In addition, the air chamber 12 is connected for fluid communication with a spring chamber 16 forming a portion of the spring retainer 20 by way of a pipe connection 18. The breather opening 14 is provided in the air chamber 12 to enable communication of an air supply from the atmosphere into such air chamber 12. In other words, the breather opening 14 allows maintenance of an ambient atmospheric pressure within air chamber 12. Such ambient atmospheric pressure is maintained, even when it changes in volume. This change in volume can occur within the air chamber 12 when activation of the brake component 30 or the spring retainer 20 occurs. A change in volume within the air chamber 12 can also occur when the temperature changes within such air chamber 12, or whenever the spring chamber 16 may vary from the ambient atmospheric pressure.

According to one presently preferred embodiment of the invention, the breather opening 14 in the air chamber 12 is equipped with an air entry breather chamber 22. This air entry breather chamber 22 is open to the environment and is located in a housing, generally designated 40. In this embodiment, the breather chamber 22 is connected for fluid communication with the air chamber 12 by means of a nipple 24. Such nipple 24 forms the breather opening 14.

The air entry breather chamber 22 is provided on the air intake side thereof with a predetermined entry cross-section. This entry cross-section is of a size that is between about 4.0 to about 25.0 times the size of the breather opening 14. It should be understood, however, that the cross-section of such air entry breather chamber 22 and that of the breather opening 14 can be of any predetermined shape and size. If, for example, these predetermined cross-sections are assumed to be generally circular in shape, then the diameter area rations would preferably be about 2 and 5. Furthermore, the ratio between the length of such air entry breather chamber 22, as seen in the general flow direction S of the fluid medium, to the diameter of the entry section or to its circular area amounts to a ratio of at least about 0.6.

It has been conclusively demonstrated that through the use of the above-mentioned area and length and/or diameter ratios of such air entry breather chamber 22, such air chamber 12 of the brake component 30 can be protected over extended operating periods of the combination spring-loaded brake cylinder 10. The air chamber 12 was protected against at least a substantial portion of sucked-in solids, fluids and steam particles, as well as any combination of the detrimental contaminants which might be entrained in the atmosphere. For this reason, significant problems in either the air chamber 12 or in the spring chamber 16, and especially to the component parts contained within these chambers, have been substantially minimized.

In tests conducted, it was discovered that the optimum area ratio of about 9.0 and a diameter ratio of about 1.0 would provide the best results. The optimum diameter for the breather opening 14 was determined to be about 8 mm. Nevertheless, it should be noted that the ratios and sizes also provided excellent results in minimizing the entrance into the air chamber 12 and the spring chamber 16 of detrimental foreign particles from the atmosphere through such breather opening 14 during operation of the combination spring-loaded brake cylinder 10.

It was found that the solid particles which were prevented from entering the air chamber 12, through the use of the present invention, have the nature of depositing themselves behind the entry area of the air entry breather chamber 22 along the wall of the housing 40.

When exhausting or other operation caused vibrations of the combination spring-loaded brake cylinder 10, these particles adhering to the wall of the housing 40 of the air entry breather chamber 22 tend to drop off. This action is, or can be, facilitated a great deal by providing a smooth surface on the wall of the air entry breather chamber 22 housing 40. No special maintenance of the air entry breather chamber 22 is necessary because even with normal cleaning, such as, by spray cleaning, it was found that the remaining solid particles in the air entry breather chamber 22 will be removed.

In the embodiment of the present invention illustrated in FIG. 1, the air entry breather chamber 22, at its outermost end facing the outside, includes a bell-shaped mouth opening formed in the housing 40. At the entry section of the air entry breather chamber 22, a drip edge 26 has been formed on the housing 40 adjacent the bell-shaped mouth opening. The drip edge 26 enhances the prevention of the unwanted fluid and solid-type particles, which have accumulated on the housing 40, from entering the air chamber 12 via the air entry breather chamber 22 and the breather opening 14 formed through the wall of such air chamber 12.

Figure 2:
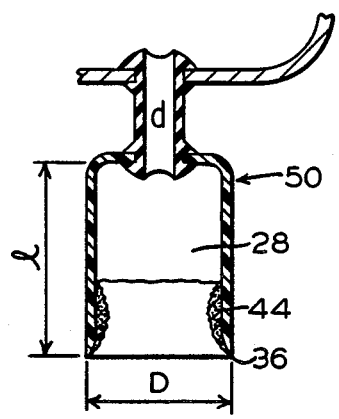
FIG. 2 is a fragmented cross-sectional view which illustrates an alternative embodiment of a breather chamber connected to a main chamber according to the present invention.
Figure 3:
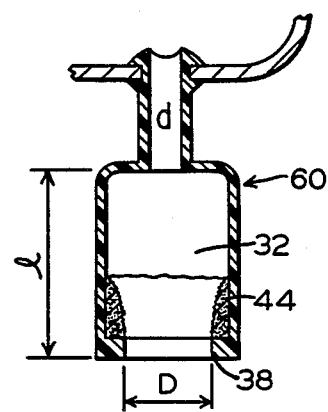
FIG. 3 is a fragmented cross-sectional view which illustrates another alternative embodiment of a breather chamber connected to a main chamber according to the present invention.
Figure 4:
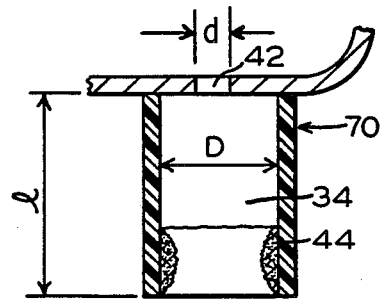
FIG. 4 is a fragmented cross-sectional view which illustrates still another alternative embodiment of a breather chamber connected to a main chamber according to the present invention.

FIGS. 2, 3 and 4 illustrate cross-sectional views of several alternative embodiments of air entry breather chambers, which will not be described in great detail. These air entry breather chambers are identified as 28, 32 and 34, respectively. Also illustrated in FIGS. 2, 3 and 4 are alternative housing designs, generally designated 50, 60 and 70, respectively. Into these alternative embodiments, the above-described diamters (b) and (d) have been added to determine a preferred one of the above-mentioned area or diameter ratio. Further, a length (l) has been illustrated to illustrate the determination of a preferred length to diameter ratio l/D. In these embodiments, as described above, D/d can lie between 2.0 and 5.0. The most preferred or optimum value is about 3.0. In addition, the l/D ratio should be at least about 0.6 with an optimum of about 1.0. However, higher values may also be possible and are comprehended as part of the present invention.

Now refer more particularly to FIG. 2, wherein it is illustrated that the air entry breather chamber 28 has its drip edge 36 toward the outside. In this alternative embodiment, the drip edge 36 does not include a simultaneous widening of the housing 50 for the air entry breather chamber 28.

Reference is now made to FIG. 3, which illustrates another alternative embodiment of an air entry breather chamber 32 provided with the formation of a drip edge 38 which has its end toward the outside. It can be seen that the drip edge 38 includes a thickened portion adjacent the outermost portion of the air entry breather chamber 32.

Now refer more particularly to FIG. 4. Illustrated in FIG. 4 is an alternative housing 70 for the air entry breather chamber 34. Alternative housing 70 is designed as a tubular-shaped member without a pipe nipple as an intermediate member between the air entry breather chamber 34 and the air chamber of the combination spring-loaded brake cylinder. The housing 70 is mounted directly on the wall of the air chamber in such a way that the air entry breather chamber 34 leads directly into the breather opening 42 in the wall of the air chamber.

In each of FIGS. 2 through 4, solid particles 44 are illustrated on the inner surface of a wall of the housing 50, 60 and 70, respectively. Such solid particles 44 are deposited on the inner surface of the wall adjacent the drip edge of the housing.

The housings 10, 50 and 60 illustrated in FIGS. 1 through 3, respectively, are designed in shape which lends themselves to the use of rubber and plastic materials which are relatively inexpensive. Further, FIGS. 1 through 3 illustrate other advantageous design possibilities for the nipple as well as a number of advantageous possibilities for the connection of the air chamber with the housing 10, 50 and 60 for the air entry breather chamber 22, 28 and 32, respectively. On the other hand, FIG. 4 shows a housing 70 which can be easily produced from metal.

In general, each of the embodiments illustrated can apply equally, as well as to all other cases of similar application.

While a number of presently preferred embodiments of the present invention have been illustrated in the drawings and described in detail above, it should be obvious to those persons who are skilled in the art that various other modifications and adaptations of the invention are possible without departing from the spirit and scope of the appended claims.

We claim:

1. An apparatus to substantially minimize an entrance of contaminated air into an ambient pressure chamber having a breather opening formed through a wall portion of a brake cylinder for fluid communication with outside atmosphere, said apparatus comprising: an open breather chamber engageable with said wall portion of said ambient pressure chamber of said brake cylinder, said open breather chamber having an entry cross-sectional area of between about 4 times and about 25 times a cross-sectional area of said breather opening, a length of said breather chamber in relationship to a diameter (D) of said entry cross-sectional area, or a representative circular area, stands in a ratio of at least about 0.6.

2. A chamber, according to claim 1, wherein said breather chamber at an end facing outside to atmosphere is equipped with an enlargement.

3. A chamber, according to claim 1, wherein said breather chamber at an end facing outside to atmosphere is equipped with a ridge.

4. A chamber, according to claim 1, wherein said breather chamber is connected to said chamber by means of a nipple having an opening which forms said breather opening.

* * * * *